United States Patent
Schmidt et al.

(10) Patent No.: US 8,919,539 B2
(45) Date of Patent: *Dec. 30, 2014

(54) ROLLER DRIVE AND METHOD FOR CONTROLLING A SYSTEM

(75) Inventors: Josef Schmidt, Graben-Neudorf (DE); Torsten Philipp, Hamburg (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 35 days.

This patent is subject to a terminal disclaimer.

(21) Appl. No.: 13/580,335

(22) PCT Filed: Feb. 15, 2011

(86) PCT No.: PCT/EP2011/000700
§ 371 (c)(1), (2), (4) Date: Aug. 21, 2012

(87) PCT Pub. No.: WO2011/103975
PCT Pub. Date: Sep. 1, 2011

(65) Prior Publication Data
US 2012/0312663 A1    Dec. 13, 2012

(30) Foreign Application Priority Data

Feb. 23, 2010 (DE) .......... 10 2010 009 072

(51) Int. Cl.
*B65G 13/06* (2006.01)
*H04Q 9/00* (2006.01)
*B65G 23/08* (2006.01)
*H02J 5/00* (2006.01)

(52) U.S. Cl.
CPC *H04Q 9/00* (2013.01); *B65G 23/08* (2013.01); *H04Q 2209/47* (2013.01); *H02J 5/005* (2013.01)
USPC ......................................................... 198/788

(58) Field of Classification Search
USPC ................................. 198/788, 781.01, 781.05
See application file for complete search history.

(56) References Cited

U.S. PATENT DOCUMENTS

| | | | |
|---|---|---|---|
| 6,244,427 B1 | 6/2001 | Syverson | |
| 6,827,202 B2 * | 12/2004 | Topmiller et al. | 198/781.05 |
| 7,705,742 B1 * | 4/2010 | Delaney, III et al. | 340/676 |
| 7,750,506 B2 | 7/2010 | Simon et al. | |
| 8,307,976 B2 * | 11/2012 | Kratz et al. | 198/788 |
| 8,365,903 B2 * | 2/2013 | Schmidt et al. | 198/788 |
| 2003/0116408 A1 * | 6/2003 | Topmiller et al. | 198/781.05 |
| 2004/0173440 A1 * | 9/2004 | Mauch et al. | 198/781.05 |
| 2006/0289273 A1 * | 12/2006 | Knepple et al. | 198/460.1 |
| 2010/0222920 A1 | 9/2010 | Andreoli | |

FOREIGN PATENT DOCUMENTS

| | | |
|---|---|---|
| DE | 101 31 019 | 12/2002 |
| DE | 10 2007 050 266 | 4/2009 |
| WO | 2005/064763 | 7/2005 |
| WO | 2009/047282 | 4/2009 |

OTHER PUBLICATIONS

International Search Report, issued in corresponding International Application No. PCT/EP2011/000700.

* cited by examiner

*Primary Examiner* — Mark A Deuble
(74) *Attorney, Agent, or Firm* — Kenyon & Kenyon LLP

(57) ABSTRACT

In a roller drive and a method for controlling a system, including a roller rotationally mounted on a roller support, an electric motor driving the roller is at least partially surrounded by the roller, such that a housing is formed, at least one sensor is disposed on the roller drive, and energy and/or data is transmittable contactlessly between the roller drive and the roller or a part co-rotatable with the roller.

18 Claims, 2 Drawing Sheets

ROLLER DRIVE AND METHOD FOR CONTROLLING A SYSTEM

FIELD OF THE INVENTION

The present invention relates to a roller drive and a method for controlling a system.

BACKGROUND INFORMATION

It is conventional to drive rollers with the aid of an electric motor.

SUMMARY

Example embodiments of the present invention provide a roller drive that permits the most effective load conveyance possible.

Among features of example embodiments of the present invention with regard to the roller drive, including a roller rotationally mounted on a roller support, are that an electric motor driving the roller is at least partially surrounded by the roller, such that a housing is formed, at least one sensor being disposed on the roller drive, and energy and/or data being transmittable contactlessly between the roller drive and the roller or a part co-rotatable with the roller.

This is advantageous because it permits an intelligent and therefore efficient control of the roller drive. In addition, not only the sensor, but also the electric motor is integrated in the roller, and therefore a compact unit is created which is able to be optimized intelligently and in terms of a variable such as energy consumption, logistical performance, etc.

In particular, the arrival of a load, thus, goods in transport, is detectable, and the roller drive is then able to be supplied with electrical energy. So long as no load is detected, a standby is realizable, which lowers the energy costs.

Moreover, information about the nature of the load or other variables specific to the load are detectable and able to be taken into account in the control of the system.

The signals of the sensor may be supplied to an electronic circuit in order to determine: the arrival of the load, the mass of the load, the speed of the load, identification information of the load, the width of the load, the length of the load, the alignment of the load relative to the roller axle, and/or a material property of the load, such as an optical, electrical and/or magnetic property.

The advantage in this context is that one or more variables are determinable and are able to be taken into account in the control of the system.

The electronic circuit may be mounted in a manner allowing it to co-rotate with the roller. The advantage in this case is that the roller assumes the housing-forming function, and thus the circuit is disposed in protected fashion. In addition, sensor signals are already able to be processed directly in the roller, and the data determined is then transmittable to the stationary part of the system.

The stator or the rotor of the electric motor may be mounted in a manner allowing co-rotation with the roller, in particular, an excitation winding being disposed in a manner allowing it to co-rotate with the roller. This offers the advantage that a direct roller drive is realizable.

Energy and/or data may be transmittable inductively, a secondary winding being disposed in a manner allowing co-rotation with the roller, which is inductively coupled to a primary winding provided in the roller support or is inductively coupled to a primary wire disposed on the roller support. This is advantageous because energy and/or data is/are contactlessly transmittable, and thus safety is able to be increased by the electrical isolation of the electrical supply with respect to the load.

The sensor may be disposed within the roller, integrated into the roller bearing, disposed in the surface of the roller, and/or disposed in an end shield of the roller drive.

This has the advantage of providing the most compact disposition possible.

The electronic circuit may be supplied inductively from a winding of the electric motor. This is advantageous because an electrical isolation is able to be realized without an additional DC/AC inverter, etc. being necessary. The reason is that the alternating currents and alternating fields available in any case for the electric motor are also used for the inductive supply.

Data or the sensor signals may be able to be modulated upon the supply voltage for the electric motor, and thus may be transmittable inductively from the secondary winding to the primary winding. The advantage in this case is that no additional means are necessary for the data transmission, and interference immunity is very high.

Data or the sensor signals may be transmitted contactlessly as radio signals or as infrared signals. This offers the advantage that the data-transmission rate is selectable to be very high.

The data of the sensor or sensors may be transmitted to an electronic circuit of the roller drive, the electronic circuit being connected to a superordinate control in order to exchange data. This is advantageous because the data is usable by the superordinate control for controlling the overall system.

Among features with regard to the method for controlling a system which has at least one above-described roller drive, in particular, the system including a roller conveyor that has a plurality of rollers, a roller drive including one of the rollers, the information acquired by a sensor or the sensors of the roller drive is supplied to a superordinate control of the system, so that a state variable of the system is determinable from the time characteristic of the values acquired by the sensor or sensors.

The advantage in this context is that an efficient control of the system, optimized in particular with respect to energy and logistics, is able to be provided.

The state variable may be a physical quantity of the load to be transported by the roller drive. The advantage here is that the control of the system is able to be optimized, because the acquired data is able to be supplied to the superordinate control.

The state variable may relate to: the presence of goods on the roller conveyor that includes the roller, the number of loads transported within the system a plurality of roller drives implemented as described herein, the weight loading of the roller-conveyor section that includes the roller, the spacing of goods on the roller conveyor, the rotational speed of the roller and/or the drive torque and/or braking torque of the roller.

The advantage here is that the control of the system is again able to be optimized, because the acquired data is able to be supplied to the superordinate control.

The length of the load conveyed may be inferred from the characteristic of the signals of the force sensor and the rotational speed of the roller. The advantage here is that the control of the system is able to be optimized, because such information is also able to be supplied to the superordinate control.

Among features with regard to the method for controlling a system which has at least one roller drive as described herein, in particular, the system including a roller conveyor that has a plurality of rollers, a roller drive one of the rollers, the information acquired by a sensor or sensors of the roller drive and assigned to the specific load, particularly the information acquired with the aid of an RFID disposed on the load, is supplied to a superordinate control of the system, so that operating time, angular position, drive torque and/or rotational speed of the roller drive are controlled as a function of the acquired information, regulated to their respective setpoint value or setpoint-value time characteristic, or adjusted.

This is advantageous because, with an RFID tag, information is assignable individually to each load, and therefore, after the tag has been read by the sensor provided in the roller or in the roller drive, the movement parameters are selectable accordingly. For example, the movement parameters also define an acceleration ramp, thus, the rise time, the duration and the duration of the fall of the acceleration characteristic as well as the values and the speed with which the values of the acceleration characteristic change. Thus, an insensitive transport load is conveyed faster and less gently, thus, with a greater jolt, than one which is more sensitive. A heavier load is driven with a higher drive torque than one which is lighter.

Example embodiments of the present invention are explained in more detail below with reference to the appended Figures.

DETAILED DESCRIPTION

Figure 1:
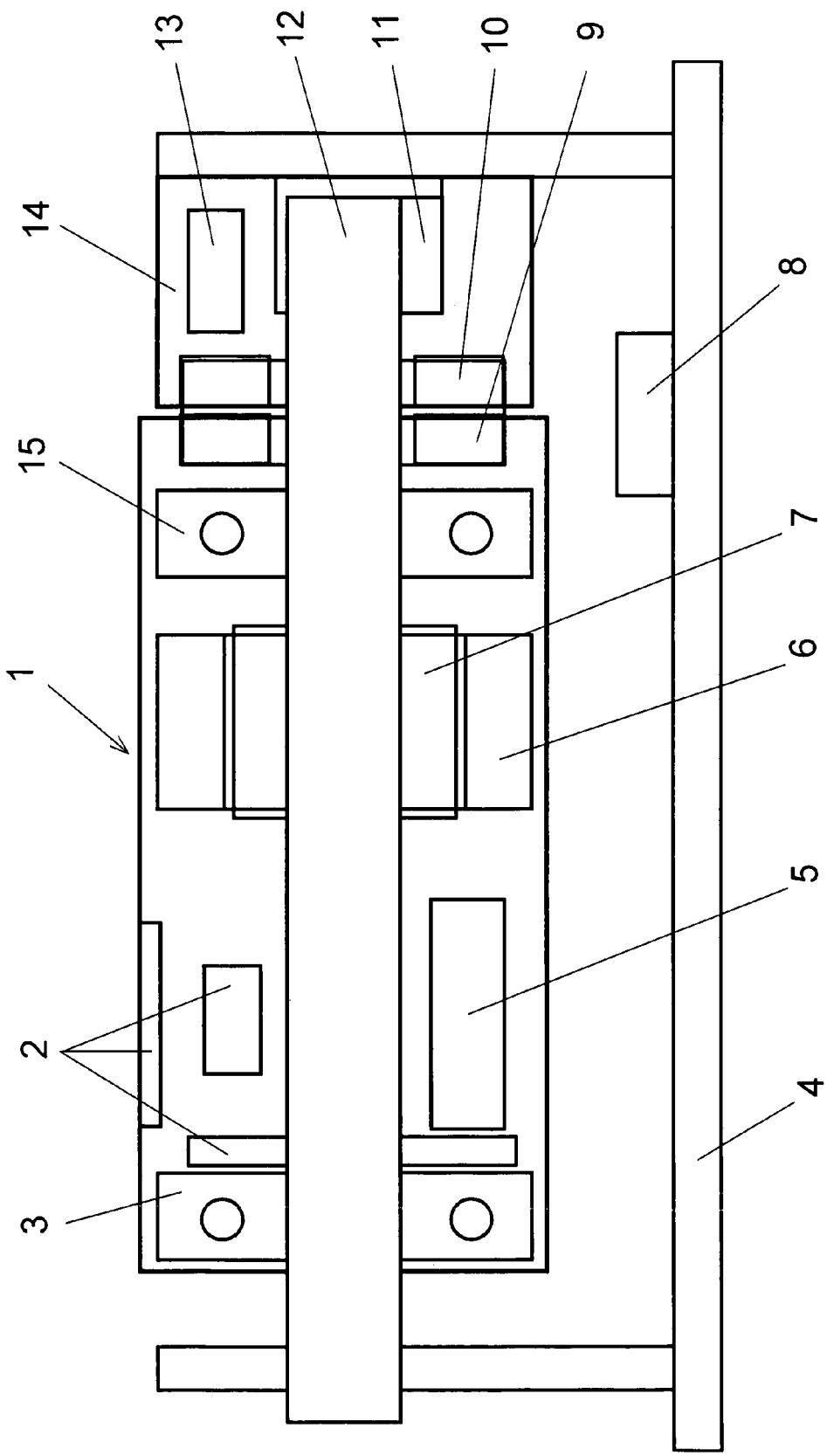
FIG. 1 is a schematic cross-sectional view of an example embodiment of the present invention.

A roller 1 is rotationally mounted with the aid of bearings 3, 15, which are supported by a roller axle 12 connected firmly to a roller support 4.

With the aid of roller 1, a load, thus, goods in transport, is able to be conveyed in a direction perpendicular to the roller axle.

A stator 6 is co-rotatably mounted on the inner side of roller 1, so that a rotor is provided, mounted on roller axle 12. The stator may be arranged as a three-phase winding, and the rotor may be provided with permanent magnets or with an excitation winding, thereby permitting a synchronous motor drive to be produced.

The rotor may be implemented as an external rotor and the stator may be mounted on the rotor axle.

The rotor may be implemented as a squirrel-cage winding, so that an asynchronous motor drive is able to be provided.

The stator and rotor may be implemented in the manner of a direct-current motor, with or without brushes, or in the manner of a reluctance motor.

A primary winding 9 is also joined to, and therefore is co-rotatable with, roller 1. Situated axially opposite is a secondary winding 10, which is secured to a housing part 14 firmly joined to roller support 4, and is surrounded by it such that a housing is formed. A contactless energy supply of the electric motor may be provided with the aid of the transformer formed by primary winding 9 and secondary winding 10. Thus, for example, if the stator is co-rotatably mounted on roller 1, then the supply of the stator is able to be provided via the transformer. On the other hand, if an excitation winding is joined to roller 1 in a manner allowing co-rotation, then it is able to be supplied via the transformer.

Also disposed in roller 1 are sensors 2, by which values of one or more physical quantities are determinable. The signals from sensors 2 are supplied to an electronic circuit 5, which is located within roller 1.

Properties detectable with the aid of a sensor 2 are the mass of the load, the width of the load, the length of the load, the alignment of the load relative to the roller axle, and/or material properties of the load, such as optical, electrical and/or magnetic properties.

For example, color, reflection capability and absorption capability are detectable as optical properties. The electrical conductivity is detectable, for instance, as electrical property.

In addition, identification information of the load is able to be sensed. For example, a barcode or an RFID is able to be read.

A pressure sensor 11 is disposed between roller axle 12 and roller support 4 and/or housing part 14, so that the loading of the roller is determinable. Particularly upon arrival of a load conveyed by roller 1, a corresponding increase of the loading is detectable.

Figure 2:
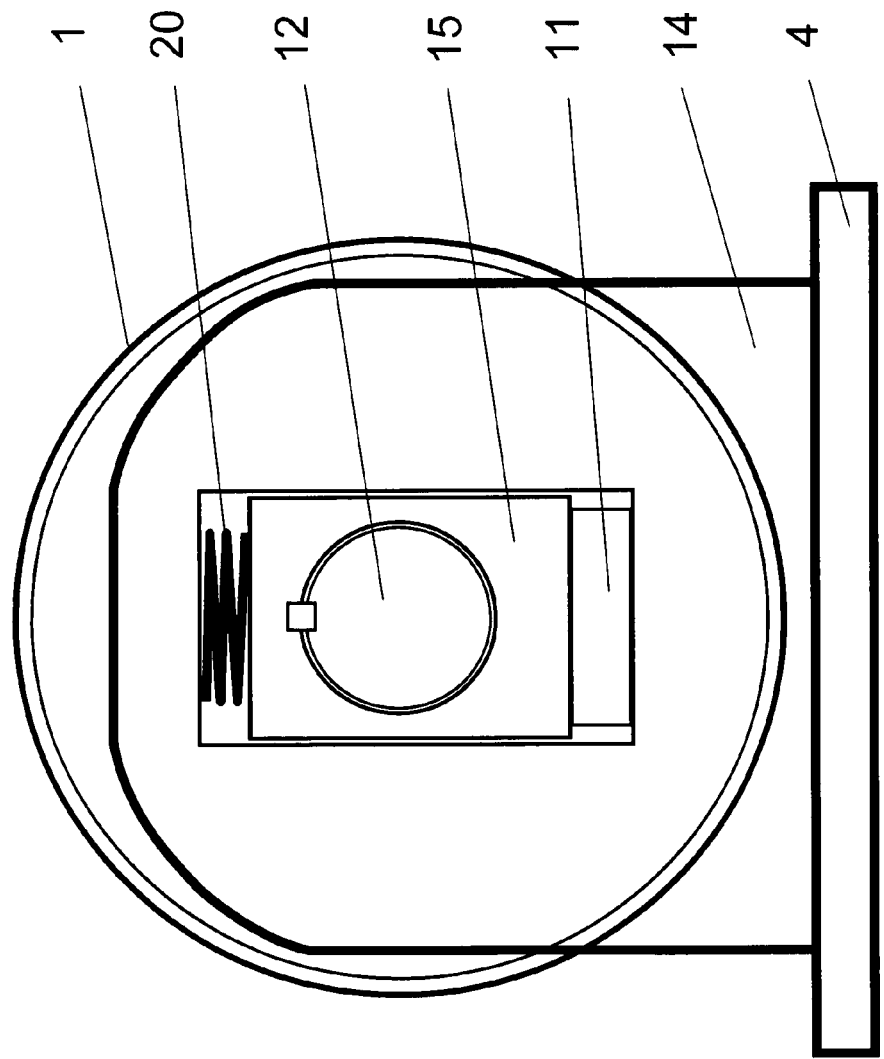
FIG. 2 shows an associated plan view.

As shown in FIG. 2, roller axle 12 is fitted into a bearing block 15 that is disposed in a manner allowing it to shift vertically in housing 14 or roller support 4. Bearing block 15 is resting on a force sensor 11, in particular, a piezoelectric force transducer. Above, thus on roller axle 12, a spring element 20 is disposed opposite force sensor 11, so that roller axle 12 is situated between force sensor 11 and spring element 20, and thus a relief of the force sensor is attainable. In addition, the measuring result and the fixation are improvable. The electrical output signal of force sensor 11 is a function of the deflection of force sensor 11, so that a load arriving on roller 1 is detectable, and even the mass is determinable.

The information detected by the sensor is usable, for instance, for influencing and for the open-loop or closed-loop control of the electric motor which drives roller 1. In this context, for example, the arrival of a load to be conveyed by roller 1 is detectable by the sensor, and the electric motor is thereupon able to be activated.

However, the information detected by the sensor is also transmittable to a superordinate control, for example, which means it is able to be supplied with information such as the arrival of the load, the mass or speed of the load, etc. As mentioned above, an identification code of the load is also identifiable by sensor 2, so that corresponding information is able to be supplied to the control.

In this manner, the control is able to be supplied with information, such as the presence of goods on the roller conveyor that includes roller 1, the number of loads transported within the system a plurality of roller drives implemented according to the present invention, the weight loading of the roller-conveyor section that includes roller 1, the spacing of goods on the roller conveyor, the rotational speed of the roller and/or the drive torque and/or braking torque of roller 1.

One or more sensors 2 are able to be disposed within roller 1, in doing which, they are integrated in bearing 3 or in the surface of roller 1 or in roller support 4.

Sensors 2 and the electronic circuit, which is situated in roller 1 and to which the signals of sensors 2 are fed, are supplied with energy in non-contact fashion via the transformer, including primary winding 9 and secondary winding 10. Alternatively, a line transformer 8 is disposed in roller support 4 for the supply of sensors 2 together with associated electronic circuit 5, or they are supplied in transformer fashion from the excitation winding of the electric motor.

The signals received by electronic circuit 5 are transmitted in non-contact fashion to the stationary part via the transformer, including primary winding 9 and secondary winding 10. Alternatively, a radio transmission to a stationary radio receiver firmly joined to the roller support is also feasible, or an infrared transmission to a stationary-mounted infrared receiver disposed next to or in the bearing seat of bearing 3 or 15.

The transmitted information is supplied to electronic circuit 13 situated in roller support 4 or in housing part 14. In addition, signals from further sensors are fed to this electronic circuit 13, so that this information is evaluable jointly and/or is transmittable to a superordinate control.

By determining the weight and/or the height of the transported load, operating parameters, e.g., torque and/or rotational speed, of the roller drive are adjustable as a function of this information.

In a first variant, the load arriving on the roller, especially a package, etc., is positioned by adjusting the roller to a desired angular position.

In a further variant, a drive torque suitable for the individual arriving load is generated as a function of the physical properties or identification information detected by RFID. Thus, a high drive torque is made available for heavy packages, and a low drive torque for light packages.

In another variant, depending on the sensitivity of the goods in transport, a suitable speed of the roller is generated and made available for the driving process.

In the aforesaid variants, the period of time during which the roller drive generates drive torque is also specifiable as a function of the specific load. Therefore, the energy needed is used sparingly, and drive energy is only consumed when it is also necessary, thus, the load is in contact with the roller, and the roller is driven.

LIST OF REFERENCE NUMERALS

1 Roller
2 Sensors
3 Bearing
4 Roller support
5 Electronic circuit
6 Stator
7 Rotor
8 Line transformer
9 Primary winding
10 Secondary winding
11 Sensor
12 Roller axle
13 Electronic circuit
14 Housing part
15 Bearing block
20 Spring element

What is claimed is:

1. A roller drive, comprising:
a roller rotationally mounted on a roller axle and a roller support;
an electric motor adapted to drive the roller being at least partially surrounded by the roller to form a housing; and
at least one sensor arranged on the roller drive;
wherein energy and/or data are contactlessly transmittable between the roller drive and the roller or a part co-rotatable with the roller; and
wherein the roller axle is attached to the roller support.

2. The roller drive according to claim 1, wherein the sensor is adapted to supply signals to an electronic circuit to determine: an arrival of a load; a mass or a weight of the load; a speed of the load; identification information of the load; a width of the load; a length of the load; an alignment of the load relative to the roller axle; and/or a material property of the load.

3. The roller drive according to claim 2, wherein the material property of the load includes an optical property, an electrical property, and/or a magnetic property.

4. The roller drive according to claim 2, wherein the electronic circuit is co-rotatable with the roller.

5. The roller drive according to claim 1, wherein a stator or a rotor of the electric motor co-rotatable with the roller and/or an excitation winding is co-rotatable with the roller.

6. The roller drive according to claim 1, wherein energy and/or data is inductively transmittable inductively, a secondary winding is co-rotatable with the roller, which is inductively coupled to a primary winding provided in the roller support or is inductively coupled to a primary wire disposed on the roller support.

7. The roller drive according to claim 1, wherein the sensor is disposed within the roller, the sensor is integrated into the roller bearing, the sensor is disposed in a surface of the roller, and/or the sensor is disposed in an end shield of the roller drive.

8. The roller drive according to claim 2, wherein a winding of the electric motor is adapted to inductively supply the electronic circuit.

9. The roller drive according to claim 1, wherein data or sensor signals are able to be modulated upon a supply voltage for the electric motor, and are transmittable inductively from a secondary winding to a primary winding.

10. The roller drive according to claim 1, wherein data or sensor signals are transmitted contactlessly as radio signals or as infrared signals.

11. The roller drive according to claim 1, wherein data of at least one sensor is transmittable to an electronic circuit of the roller drive, the electronic circuit being connected to a superordinate control for exchanging data.

12. A method for controlling a system which has at least one roller drive as recited in claim 1, comprising:
supplying information acquired by at least one sensor of the roller drive to a superordinate control of the system; and
determining a state variable of the system from a time characteristic of values acquired by the sensor.

13. The method according to claim 12, wherein the state variable is a physical quantity of a load to be transported by the roller drive.

14. The method according to claim 12, wherein the state variable relates to presence of goods on a roller conveyor that includes the roller 1, a number of loads transported within the system, weight loading of a roller-conveyor section that includes the roller, a spacing of goods on the roller conveyor, a rotational speed of the roller, and/or a drive torque and/or a braking torque of roller.

15. The method according to claim 12, further comprising inferring a length of a transported load from a characteristic of signals of a force sensor and a rotational speed of the roller.

16. A method for controlling a system which has at least one roller drive as recited in claim 1, comprising:
supplying information acquired by the roller drive and assigned to a specific load and/or information acquired with the aid of an RFID disposed on the load to a superordinate control of the system; and
controlling operating time, angular position, drive torque and/or rotational speed of the roller drive as a function of the acquired information, regulating operating time, angular position, drive torque and/or rotational speed to respective setpoint values or setpoint-value time characteristics, and/or adjusting operating time, angular position, drive torque and/or rotational speed.

17. The roller drive according to claim 1, wherein a pressure sensor is positioned between the roller axle and the roller support.

18. The roller drive according to claim 17, wherein a spring element is positioned opposite the pressure sensor, such that the roller axle is positioned between the pressure sensor and the spring element.

* * * * *